United States Patent [19]  [11] 3,870,701
Teng et al.  [45] Mar. 11, 1975

[54] BENZYL HYDROXYPROPYL CELLULOSE ACETATE AND PROCESS

[75] Inventors: James Teng, St. Louis County; Marcella C. Stubits, St. Louis, both of Mo.

[73] Assignee: Anheuser-Busch, Incorporated, St. Louis, Mo.

[22] Filed: Oct. 15, 1973

[21] Appl. No.: 406,238

[52] U.S. Cl. ............... 260/226, 106/169, 106/187, 106/189, 252/316
[51] Int. Cl. ..................... C08b 13/00, C08b 21/34
[58] Field of Search ...... 252/316; 260/226; 106/169

[56] References Cited
UNITED STATES PATENTS
2,055,892  9/1936  Dreyfus .............................. 260/226
2,613,142  10/1952  Wiczer ............................... 252/316
3,322,130  5/1967  Panzer et al. ....................... 131/17
3,435,027  3/1969  Desmarais et al. ................. 260/226
3,767,787  10/1973  Segal .................................. 252/316

FOREIGN PATENTS OR APPLICATIONS
331,903  6/1930  Great Britain ..................... 260/226

Primary Examiner—Ronald W. Griffin
Attorney, Agent, or Firm—Gravely, Lieder & Woodruff

[57] ABSTRACT

This disclosure involves the acetate ester of benzyl hydroxypropyl cellulose. This particular cellulose ester is useful as a gelling agent for organic solvents. The benzyl hydroxypropyl cellulose acetate is prepared by the simultaneous hydroxypropylation and benzylation of cellulose and by the continuation of the cellulose derivatization into acetylation. The overlapping relationship of the hydroxypropylation and acetylation processes is found to be effecient and economical in that it eliminates the difficulty of isolation and recovery of the water insoluble benzyl hydroxypropyl cellulose.

12 Claims, No Drawings

BENZYL HYDROXYPROPYL CELLULOSE ACETATE AND PROCESS

BACKGROUND OF THE INVENTION

In a wide variety of applications there exits the need for a product which will thicken or gel organic based formulations. To meet this need, several gelling agents for organic solvents are available on the market. These generally include colloidal particles (such as silica), metallic soaps (aluminum soap), and cellulose derivatives that require polar co-solvents.

In co-pending application Ser. No. 222,660, entitled ESTERS OF POLYMERIC HYDROXYPROPYL CARBOHYDRATES AND METHOD OF USING SAME AS GELLING AGENT FOR ORGANIC SOLVENTS, filed on Feb. 1, 1972 now U.S. Pat. No. 3,824,085, issued July 16, 1974 and assigned to the assignee of the present invention, there is described and claimed a gelling agent and process for making same. The process of said co-pending application involves the use of hydroxypropyl cellulose and starch esters, specifically the acetate and laurate esters. The process is quite satisfactory and the hydroxypropyl carbohydrate esters are capable of gelling a large number of organic solvents.

Co-pending application Ser. No. 387,894 entitled METHYL HYDROXYPROPYL CELLULOSE ACETATE AND PROCESS filed Aug. 13, 1973 and assigned to the assignee of the present invention describes and claims another gelling agent and process for making same. The process of this co-pending application involves the use of methyl hydroxypropyl cellulose acetate. This novel gelling agent is capable of gelling a large number of organic solvents.

In accordance with the present invention a new composition and process has been discovered which comprises the hydroxypropylation, benzylation and acetylation of cellulose in one continuous process to produce benzyl hydroxypropyl cellulose acetate, a water insoluble gelling agent for organic solvents. More specifically, the process of this invention involves the simultaneous hydroxypropylation and benzylation of cellulose with the continued derivatization of cellulose into the acetate. The commencement of the acetylation process prior to the cessation of the hydroxypropylation process eliminates the isolation and recovery of the benzyl hydroxypropyl cellulose. As a result, the product is formed in one continuous process.

The preparation of this new polymeric carbohydrate derivative is economical, based on both material and processing costs. The reactions are run under mild conditions, with only a closed reaction vessel required.

Thus, one of the principal objects of the present invention is to provide a new polymeric carbohydrate derivative capable of gelling organic solvents. Another principal object of this invention is to provide a gelling agent for organic solvents that is water insoluble. Still another object is to provide a method of making a gelled organic solvent from benzyl hydroxypropyl cellulose acetate. Another object is to provide a method of making an improved gelling agent for organic solvents by the simultaneous hydroxypropylation and benzylation of cellulose and continuing the cellulose derivatization by acetylation. Other objects and advantages will become apparent hereinafter.

Gelling of volatile chemicals retards the rate of vaporization allowing only a slow release of vapor. The gelling agent of the present invention is useful in many applications, some of which include gelling soil fumigants, herbicides, paint stripping formulations and cleaning solvents. Some of the organic solvents which the benzyl hydroxypropyl cellulose acetate of this invention is capable of gelling include: carbon tetrachloride, toluene, acetonitrile, ethyl acetate, methyl ethyl ketone, dioxane, dimethyl sulfoxide, dimethyl formamide, pyridine, and benzyl alcohol.

SUMMARY OF THE INVENTION

This invention comprises a water insoluble polymeric carbohydrate derivative, benzyl hydroxypropyl cellulose acetate, which is capable of gelling a broad range of organic solvents, and the process of making the same.

DETAILED DESCRIPTION

The product of this invention is a mixed ether-ester capable of thickening or gelling a wide variety of solvents. This polymeric gelling agent provides many desirable properties which are lacking in the presently available gelling agents. It is insoluble in water, soluble in organic solvents and is inert, non-ionic and non-hygroscopic. It is easy to handle, creating no dust or bulk problem and no special equipment, such as homogenizers, are needed for dissolution. Solutions and gels may be easily prepared by adding the gelling agent to an organic solvent under high speed agitation. After mixing, the mixture is allowed to stand for about one to ten minutes to complete gelation or thickening. The gel which is formed has a long shelf life, developing no syneresis, and is stable to temperature changes and vibrational influences. The gel has a smooth elastic body but not to the point of excessive stringiness. The thickened solutions exhibit thixotropic or pseudo-plastic properties at low concentrations. This facilitates handling of the thickened solutions in pumping and mixing. Gels can usually be formed at concentrations below 1% of gelling agent. The present gelling agent is soluble in a wide range of organic solvents and is an effective thickener or gellant at low concentrations.

Examples of solvents which are capable of being gelled with benzyl hydroxypropyl cellulose acetate are seen in Table I. These organic solvents may be esters, ketones, aromatic hydrocarbons, nitriles, amides, alcohols or halogenated solvents with a solubility parameter of about 8 to about 12.

The solubility parameter is a method of measuring the compatability of the benzyl hydroxypropyl cellulose with various solvents and is set forth in *Polymer Handbook* edited by E. H. Immergut, Interscience Publishers (1966). This method utilizes a solubility parameter or $\delta$ which is a thermodynamic property of solvents and may be used to measure their mutual compatibility. For example, two solvents with the same value will be miscible and a solute with the same $\delta$ value will be soluble in both, regardless of the nature of the solvents. Once the $\delta$ value for a given polymer is determined by dissolution in a few solvents, all other solvents with comparable $\delta$ values will also dissolve it.

The term solubility as used in this context has a somewhat different meaning than it conventionally has. Solubility is used generally to indicate the extent of interaction between a solid and a solvent. A piece of solid, when placed in a solvent, will dissolve into the solvent until the saturation point is reached. At that point, the two phases, solid and liquid coexist at equilibrium. The amount of solute in liquid is measured as the solubility of the material in solution. However, there is no such saturation point in the case of the gelling agents of this invention. When immersed in a 'compatible' solvent, the gelling agents swell and dissolve. As more and more gelling agent is added, the material will continue to swell and dissolve. When there is insufficient solvent to disassociate completely the polymers, then swelling only occurs. A single phase (solution or gel) is reached at all times. To examine qualitatively the compatibility of a gelling agent, 5 g. of gelling agent is placed in 100 ml. of solvent. It is compatible if only one phase is observed (gel or solution). It is incompatible when the mixture retains two phases.

Table I shows examples of solvents with their corresponding solubility parameter. The benzyl hydroxypropyl cellulose acetate gels solvents with a solubility parameter of 8 to 12.

TABLE I

| SOLVENTS | SOLUBILITY PARAMETER |
|---|---|
| Ethyl acetate | 8.4 |
| Carbon tetrachloride | 8.4 |
| Toluene | 8.9 |
| Methyl ethyl ketone | 9.3 |
| Methylene chloride | 9.7 |
| Dioxane | 10.0 |
| Pyridine | 10.3 |
| Acetonitrile | 11.5 |
| Dimethyl sulfoxide | 12.0 |
| Dimethyl formamide | 12.1 |
| Benzyl alcohol | 12.1 |

The product of this invention is chemically distinct from the products of application Ser. Nos. 222,660, and 387,894 even though they possess similar properties.

The benzyl hydroxypropyl cellulose acetate of this invention has a D.S. of about 0.1 to about 0.8 benzyl group, preferably about 0.3 to about 0.6; a D.S. of about 1 to about 2.5 acetyl groups, preferably about 1.1 to about 1.5; and an M.S. of about 2 to about 6 hydroxypropyl groups, preferably about 3 to about 4.

The purpose of the following paragraph is to explain the use herein of the term 'degree of substitution' (D.S.) and degree of molar substitution (M.S.).

The degree of substitution is defined as the average number of hydroxyl groups substituted per anhydroglucose unit. The maximum number of hydroxyl groups per anhydroglucose is three and therefore the theoretical maximum degree of substitution is also three in the case of monofunctional substituents.

In the case of polyfunctional or polymerizable substituents that can react not only with the hydroxyl groups but also with themselves, the number of substituents is no longer limited by the three available hydroxyl groups on the anhydroglucose unit. The term 'degree of molar substitution', (M.S.) is adopted and defined simply as the number of moles of substituent per anhydroglucose unit. There is no theoretical maximum value for the degree of molar substitution, (M.S.).

The amount of polymeric carbohydrate derivative used as a gelling agent is at least about 0.4 grams per 100 ml. of solvent and may be as much as 5 grams per 100 ml. depending upon the desired gel viscosity.

Gels and thickened solutions may be easily prepared by adding the benzyl hydroxypropyl cellulose acetate to the solvent under high speed agitation. Heat may be used to speed dissolution. The final gel has a specific gravity substantially that of the solvent being gelled.

The preferred process for making the composition of this invention involves the simultaneous hydroxypropylation and benzylation of cellulose with the continued derivatization of cellulose into the acetate ester.

SPECIFIC EXAMPLES

Following are specific examples showing the method of making benzyl hydroxypropyl cellulose acetate and its application in gelling organic solvents.

EXAMPLE NO. 1

The following reactants are mixed in a stainless steel pressure reactor:

| Cellulose | 5 | g. |
| Propylene Oxide | 17 | g. |
| Sodium Hydroxide (25% aqueous solution) | 2 | ml. |
| Benzyl Chloride | 1.1 | g. |
| Toluene | 100 | ml. |

The temperature is slowly raised from 25° to 95°C. over a period of 6 hours and then held at 95°C. for two hours. At the end of the reaction, the mixture is cooled to 25°C. and the toluene solvent decanted.

Next, approximately 15 ml. acetic anhydride, and 7.5 g. trimethylamine in 100 ml. hexane are introduced to the reactor. This is the acetylation reaction and it proceeds at 25°C. for 30 minutes.

The final reaction mixture is washed with water, neutralized with sodium bicarbonate solution, washed with water again and dried.

The product is recovered as a white powder which has a degree of molar substitution of 3.8, a degree of substitution of benzyl groups of 0.28 and a degree of substitution of acetyl groups of 1.3.

EXAMPLE NO. 2

One gram of the benzyl hydroxypropyl cellulose acetate from Example No. 1 is added to 100 ml. toluene, and stirred by a simple electric mixer for 15 minutes at 25°C. The resultant clear gel had a viscosity of 1000 cps as measured on a Brookfield RVT Viscometer at 10 rpm, using a No. 3 spindle. Similar results are obtained for all solvents listed in Table I.

EXAMPLE NO. 3

This example shows a method of making benzyl hydroxypropyl cellulose acetate from alkali cellulose.

Forty grams of cellulose are steeped in 2 liters of 12% aqueous sodium hydroxide solution for 5 minutes at 40°C. Then the cellulose is pressed to remove excess alkali. The press weight ratio is 1.7 and the total alkali content is 4 grams.

The alkali cellulose cake is dispersed in 450 ml. toluene and transferred to a stainless steel pressure reactor. Next, 170 grams propylene oxide and 17.6 grams benzyl chloride are added. The vessel is sealed, purged with nitrogen, and the temperature is slowly raised from 25° to 95°C. over a period of 5 hours. The mixture is held at 95°C. for 2 hours, then cooled to 25°C., and the excess solvent decanted.

This reaction mixture is then acetylated with 65 ml. of acetic anhydride and 40 g. of trimethylamine in 500 ml. hexane. The mixture is stirred for 45 minutes at 25°C. The solvent is decanted, and the product is washed with water and dried under vacuum at 60°C. The resultant white powder has a degree of molar substitution of 4 hydroxypropyl groups, a degree of substitution of benzyl groups of 0.56 and a degree of substitution of acetyl groups of 1.2. The material is compatible with all the solvents listed in Table 1. This invention is intended to cover all changes and modifications of the examples of the invention herein chosen for purposes of the disclosure which do not constitute departures from the spirit and scope of the invention.

What is claimed is:

1. The compound benzyl hydroxypropyl cellulose acetate having a degree of molar substitution of about 2 to about 6 hydroxypropyl groups, a degree of substitution of benzyl groups of about 0.1 to about 0.8 and a degree of substitution of acetyl groups of about 1.0 to about 2.5 and further characterized by being soluble in organic solvents.

2. The process of preparing benzyl hydroxypropyl cellulose acetate which comprises the steps of hydroxypropylation, benzylation and acetylation of cellulose, and recovering a benzyl hydroxypropyl cellulose acetate having a degree of molar substitution of hydroxyl groups of about 2 to 6, a degree of substitution of benzyl groups of about 0.1 to about 0.8 and a degree of substitution of acetyl groups of about 1.0 to about 2.5.

3. The process of claim 2 wherein propylene oxide is the hydroxyalkylation reagent.

4. The process of claim 2 wherein benzyl chloride is the benzylation reagent.

5. The process of claim 2 wherein acetic anhydride is the acetylation reagent.

6. The process of claim 2 wherein the steps of hydroxypropylation and benzylation occur simultaneously and the acetylation commences prior to the ending of the simultaneous hydroxypropylation and benzylation of the cellulose.

7. A gelled or thickened organic solvent composition comprising a major amount of an organic solvent having a solubility parameter of about 8 to about 12 and an effective amount of benzyl hydroxypropyl cellulose acetate having a degree of molar substitution of hydroxypropyl groups of about 2 to about 6, a degree of substitution of benzyl groups of about 0.1 to about 0.8, and a degree of substitution of acetyl groups of about 1.0 to about 2.5.

8. The process of claim 7 wherein the solvent is an organic solvent.

9. The process of claim 7 wherein the benzylation reagent is benzyl chloride.

10. The process of claim 7 wherein the hydroxypropylation reagent is propylene oxide.

11. A process of gelling an organic solvent fluid having a solubility parameter between about 8 and about 12, comprising adding to said fluid benzyl hydroxypropyl cellulose acetate in an amount to thicken or gel said fluid, said benzyl hydroxypropyl cellulose acetate having a degree of molar substitution of hydroxyl groups of about 2 to 6, a degree of substitution of benzyl groups of about 0.1 to about 0.8 and a degree of substitution of acetyl groups of about 1.0 to about 2.5.

12. The process of preparing benzyl hydroxypropyl cellulose acetate, comprising the steps of:

A. forming a filter cake of the cellulose with alkali,
B. dispersing the cake in a solvent,
C. adding a benzylating reagent,
D. adding a hydroxypropylation reagent,
E. heating the mixture to a temperature and for a time sufficient to produce benzyl hydroxypropyl cellulose having a degree of substitution of benzyl groups of about 0.1 to about 0.8 and a degree of molar substitution of hydroxypropyl groups of about 2 to 6,
F. adding acetic anhydride,
G. and recovering a benzyl hydroxypropyl cellulose acetate having a degree of substitution of acetyl groups of about 1.0 to about 2.5.

* * * * *